Patented Jan. 23, 1951

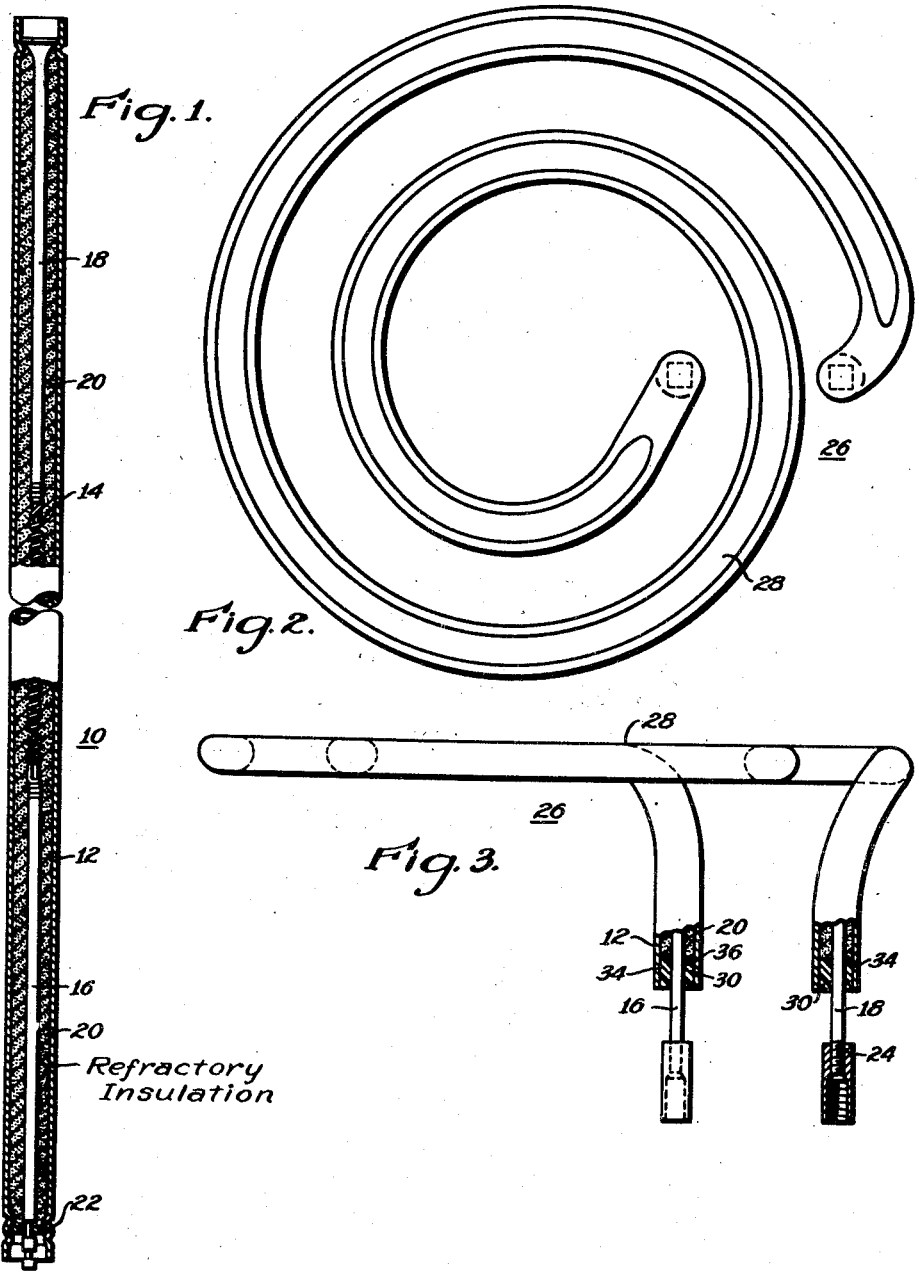

2,538,808

UNITED STATES PATENT OFFICE 2,538,808

SEALED HEATER ELEMENT AND THE LIKE

Jack Swiss, Murrysville, Pa., assignor to Westinghouse Electric Corporation, East Pittsburgh, Pa., a corporation of Pennsylvania Application March 24, 1950, Serial No. 151,621

5 Claims. (Cl. 201—67)

This invention relates to the process of tightly or hermetically sealing openings in members, and particularly the terminals of sheathed electrical heating coils.

This application is a continuation in part of my copending patent application Serial No. 733,371 filed March 8, 1947, now abandoned, and assigned to the assignee of the present invention.

The problem of providing a relatively air and moisture proof seal for openings in relatively rigid structures made of metal, glass, or the relatively low elasticity materials has been quite exacting, particularly where the structures are subjected to elevated temperatures during use. The thermal expansion and contraction of the structure sealed often results in a breaking apart of the seal applied to the aperture and consequent failure. Specifically, sheathed heater elements employed in electrical ranges and as immersion heaters are subject to deterioration or failure if interior of the sheath, wherein is disposed the resistance heating element thereof, is exposed to air and moisture. The insulation disposed between the heating element and the walls of the protecting sheath deteriorates markedly in insulation resistance when subjected to moisture. Glass beads or seals have been applied to heater terminals for sealing purposes but the percentage of failure of such seals in use is high as a result of cracking due either to mechanical or thermal shock or other failure.

The object of this invention is to provide a method for producing a tight or hermetic seal of an opening in a member.

A further object of the invention is to provide an insulating hermetic seal for the terminals of sheathed electrical elements.

Still other objects of the invention will become apparent upon reading the following specification and drawing, in which:

Figure 1 is a view in elevation partly broken and partly in cross section of a heater element for use in an electrical range during an early part of its construction;

Fig. 2 is a plan view of a completed electrical range heater, and

Fig. 3 is a view in side elevation partly in cross section of the heater of Fig. 2.

It has been discovered that when a body of solid polytetrafluoroethylene is confined at a temperature of from 320° C. to 500° C. or polychlorotrifluoroethylene when confined at a temperature of at least 250° C., either solid being confined under a substantial pressure of at least 100 p. s. i. and cooled substantially below 200° C. while under such pressure, each body of solid then possesses the property of "unmolding" when heated to a temperature of above 200° C. The treated body of polytetrafluoroethylene or polychlorotrifluoroethylene may be cut, severed or otherwise machined and prepared into members of any desired shape at room temperature but when heated to an elevated temperature of about 200° C. and higher the processed shaped members will "unmold" or expand permanently in at least one direction, and one cross-sectional area will exhibit a greater permanent increase in area than any other cross-section. Usually in one direction perpendicular to the area of maximum expansion, the body will assume a permanent contraction. The expansion occurs within a short period of time after heating, generally within an hour or so. Such permanent expansion will be greater for higher temperatures. The maximum expansion is realized when a temperature of about 320° C. and higher has been applied to the member for a period of about a day. If a member of the treated polymer is confined in such a manner as to oppose the expansion, the member will develop a pressure against the confining means when heated above 200° C. The combination of such permanent expansion due to unmolding with the plastic properties of polytetrafluoroethylene and polychlorotrifluoroethylene will enable sealing plugs of either polymer to conform to the roughness or inequalities of confining surfaces so that a seal possessing hermetic properties can be readily obtained. I have found that the maximum permanent linear expansion of either processed polymer will vary from about 10% at 200° C. to at least 30% at 300° C. of the original dimension. An increase in cross-sectional areas as a result of such permanent expansion of these polymers of the order of 10% is readily obtained.

Permanent expansion of bodies of either polymer can be secured by cold working them to reduce them at least one dimension, thereby imparting preferential unmolding characteristics. Best results from cold working are had by cold working polymers of a density of at least 2 until the worked product has a density of 2.09 and higher. The polytetrafluoroethylene and polychlorotrifluoroethylene bodies previous to cold working may have been prepared initially by molding at pressures of at least 100 p. s. i. while heated above their reversible transition temperatures of about 320° C. and 250° C., respectively, and cooled while so compressed thereby resulting in a body of a density of at least 2.09. Also bodies that have a density of below 2.08 may be cold worked to impart unmolding properties thereto. The density of the body of the polymer is indicative of whether or not the body will unmold when heated above 200° C., that is, densities of 2.09 and up are possessed by bodies that will unmold. Sheets of polytetrafluoroethylene may be rolled at room temperature to reduce the thickness by 50% and thereby imparting a compressed condition. Portions of the rolled material when heated to 200° C. or higher will expand to relieve the compression imparted by the rolling. Other dimensions may shrink slightly. This corresponds in some of its aspects to what is known as "elastic memory" or "elastic recovery."

It has been found that bodies of either polytetrafluoroethylene or polychlorotrifluoroethylene having a density of below 2.08 have no unmolding properties or at most exhibit so little permanent expansion that it is negligible. Polychlorotrifluoroethylene bodies of a density of 2.09 and higher have exhibited substantial permanent expansion of at least 13.1% in one dimension when heated to 200° C. and higher. Polytetrafluoroethylene of a density of 2.16 exhibited a maximum cross-sectional increase when heated to unmolding temperatures of 9.7%. In one case a rolled sheet of polytetrafluoroethylene of a rolled thickness of 0.015 inch after heating to 350° C. for 40 hours and cooling to room temperature permanently expanded to a thickness of 0.03 inch, while the length decreased 35%. By comparison a portion of polytetrafluoroethylene of a density of 2.05 when heated to 300° C. for several hours exhibited no appreciable change in any dimension when cooled to room temperature.

Sealing plugs or similar members may be prepared from large blocks or other molded pieces of polymerized tetrafluoroethylene produced under heat and pressure or individual sealing plugs may be molded in molds wherein the maximum pressure is applied in a direction corresponding to the transverse section of the aperture or opening to be sealed. By applying the sealing plug to the aperture or opening with either a close fit or a mechanical force fit and then heating the sealing plug of polymerized tetrafluoroethylene or chlorotrifluoroethylene to a temperature of about 200° C. unmolding takes place and the sealing plug will expand to completely fill the aperture or opening under considerable pressure, thereby providing a hermetic seal.

Rods of polytetrafluoroethylene or polychlorotrifluoroethylene may be cold rolled from a large diameter to a diameter closely approximating the opening to be sealed and the rod severed into plugs of suitable length which may be placed in the opening and heated to a temperature of at least 200° C. whereupon the plugs will expand to fill the opening tightly.

In preparing a molded body of polytetrafluoroethylene suitable for the practice of this invention, the following process may be employed. When prepared by known polymerizing processes, polytetrafluoroethylene and polychlorotrifluoroethylene are white or brown powders which undergo a reversible transition above about 320° C. and about 250° C., respectively. A weighed quantity of the powder is placed within a mold and cold pressed at a pressure of from 100 pounds to as much as 5000 pounds per square inch. The compact or preform so produced may be sintered by heating it within a mold while maintaining a pressure of at least 100 p. s. i. to a temperature of from 320° C. to 500° C., that is, above the transition point temperature, and cooled substantially below 200° C. before the pressure is relieved. Alternatively, cold pressed rods of the polymer may be placed within a close fitting contained such as a capped steel pipe or an equivalent confining structure, and the assembly placed within a furnace or oven where it may be heated to a temperature of above about 320° C. and preferably to above 400° C. The linear coefficient of thermal expansion of polytetrafluoroethylene is greater than that of steel and accordingly during the heating process, the polymer is subjected to an autogenous pressure suitable for the purpose of the invention. The sintering operation produces a homogeneous, coherent solid possessing excellent physical properties but having little or no unmolding properties since the autogenous pressure is less than 100 p. s. i. at 300° C. The rod so produced may be machined with metal working tools to any predetermined shape or size. Slabs, rods or sheets of the polymer so produced are then subjected to cold working by rolling processes to reduce the thickness or diameter by about 50%, which cold worked product now exhibits a tendency to expand permanently on reheating to temperatures of about 200° C. and higher.

It should be understood that this "permanent expansion" due to unmolding of the polymer when heated to a temperature of at least 200° C. is additional to the thermal expansion, and on cooling to room temperature it will be found that the shape of the member has changed permanently.

The polytetrafluoroethylene and polychlorotrifluoroethylene bodies produced by sintering under pressure or by other means described herein may be machined to sealing plugs having substantially the dimensions of the aperture to be sealed so that the sealing plug fits closely, usually not looser than 5% of the diameter of the opening, the entire aperture or opening. In practice, it has been found that the plug may be made slightly larger in cross sectional area than the aperture or opening to be sealed and the plug may be forced into the aperture by applying pressure thereto. In the case of metallic members, the edges of the opening will shave the excess polymer to a size exactly fitting the aperture. In some cases, the aperture may be tapered so that a plug with a matching taper may be forced in as a taper fit thereby providing a fairly tight seal by applying only moderate pressure or a light blow from a hammer or the like.

If the aperture or opening to be sealed is relatively great compared to the thickness of the sealing plug, it may be desirable to reinforce the polytetrafluoroethylene or polychlorotrifluoroethylene with suitable solid fillers, such as silica, asbestos powder, powdered glass, glass fibers or metallic powders. These finely divided or fibrous materials may be admixed with the powdered polymer before it is molded by sintering under pressure. A woven or other sheet material composed of glass fibers, metal wire, asbestos fibers or the like may be combined with sheets of polytetrafluoroethylene or polychlorotrifluoroethylene or both, and the assembly molded under a confined pressure similar to the process described employing the powdered tetrafluoroethylene polymer. It will be apparent to those skilled in the art, that these or other expedients may be resorted to for reinforcing the molded sealing plugs to withstand the pressures or service conditions to be met. In any event, the sealing plug must be produced by heating above 320° C. or 250° C. while subjected to a substantial pressure confining the polytetrafluoroethylene or polychlorotrifluoroethylene at the transverse cross section of the opening to be sealed, then cooled substantially below 200° C. while under pressure or the plug cold worked as described.

For a specific application in which the invention has been found to be most advantageous, reference should be had to the drawings illustrating a hermetically sealed electrical resistance unit, such as is employed in an electrical range. Figure 1 of the drawing shows one of the early stages of the manufacture of the heater unit 10. The heater comprises a sheath 12 which is a cylindrical tube with open ends within which there is centrally disposed a resistance 14 connected to solid terminals 16 and 18, respectively. A solid insulating powder 20, such as magnesium oxide or other refractory insulation, is packed within the sheath 12 to insulate the resistance 14 from the sheath. The refractory insulation 20 is compacted under pressure in order to minimize the amount of air present and for other reasons. The sheath 12 proper is composed of a suitable metallic alloy, such, for example, as a stainless, stabilized chrome nickel steel resistance to corrosion. The terminals 16 and 18 may be of the same material as the sheath or may be composed of an open hearth steel. As shown in Fig. 1, the terminals 16 and 18 are considerably longer than required in the completed heating unit. A cap 22 cooperates with the sheath to retain the insulation 20 under pressure.

The heating element 10 of Fig. 1 is bent into a coil 26, as shown in Fig. 2, and then the upper surface on the coil 26 is subjected to flattening in a press to provide for a flat heating surface 28 as well as to compress the insulation 20 to a greater density. The ends of the sheath 12 are cut off a short distance from each end in order to expose about an inch or more of the terminals 16 and 18. The resistance 14 may be heated in order to expel any gases or moisture that may be present. As illustrated in Fig. 3 of the drawing, the terminals 16 and 18 are provided with threads to which connectors 24 may be attached in a final operation by screwing it on. The end portions 34 of the sheath 12 are treated to remove the compacted refractory insulation 20 to a predetermined depth of about ½" to provide for the reception of a sealing plug 30.

The sealing plug 30 is composed of polymerized polytetrafluoroethylene or polychlorofluoroethylene or a mixture of both treated to possess the property of unmolding. The plug 30 comprises a bore 36 which fits over the terminals 16 or 18 closely but movably. The exterior of the plug 30 may be of a size to fit the end 34 snugly or it may be somewhat larger in size requiring pressure to force the plug 30 into place, even to the extent of shaving off a portion of the plug. Thereafter the coil 26 may be heated to produce a temperature of about 200° C. at the sealing plugs 30. At this temperature, the plug will unmold or expand radially against the sheath walls 34 with considerable pressure. This expansion will not only cause the sealing plug 30 to conform to all the surface variations of the internal wall of the sheath at 34 but will also cause the plug 30 to contract about the terminals 16, thereby providing a complete, substantially hermetic seal at each end of the sheath.

While it is preferable in most cases that the heat treatment of the plug be accomplished immediately after assembly this is not necessary if the plug 30 fits fairly snugly against the terminals 16 or 18 and the sheath end 34. When installed in the range, the operating temperatures customarily encountered will cause the plug to unmold or expand during service and effect a hermetical seal.

In one test sealing plugs made in accordance with this invention were placed within a heating unit and subjected to heat treatment for 20 days at a temperature of 275° C. No shrinkage or cracking of the plug was visible. No appreciable weight losses of material was encountered in this press period. These temperatures are as high as will be met with in practice. It will be appreciated that polytetrafluoroethylene and polychlorotrifluoroethylene are good electrical insulators and the plugs 30 will afford excellent electrical insulation between the sheath and the resistance element terminals.

The sealing plugs possess a desirable degree of resiliency that is not lost on ageing for prolonged periods at elevated temperatures. Samples of polytetrafluoroethylene have been aged for two years at 250° C. without increase of stiffness sufficient to render them brittle. This property is desirable in a sealing plug if a substantially permanent hermetic seal is to be attained.

A ¼ inch nominal thickness sheet of polytetrafluoroethylene of a density of 2.157 was cut into rods approximately 0.477 inch long and 0.253 inch diameter. These rods were heated at 275° C. for ½ hour. When cooled to room temperature the rods had deformed into an elliptical cross-section of 0.298 and 0.234 inch major and minor radius, respectively, and the length contracted to 0.440 inch. The cross sectional area had increased 9.7%. The dimension of greatest expansion was perpendicular to the surface of the original sheet. Other rods of a 7/64 inch diameter were severed from the ¼ inch thick sheet, some with their axis parallel to the flat surface of the sheet and others with their axis cut vertically through the surface of the sheet. The rods were pressed into holes in steel blocks of the same diameter as the rods and the assemblies heated for 30 minutes at 275° C. After cooling to room temperature it was found that the rods cut with their axis parallel to the surface of the sheet were tightly in place in the blocks, while the rods cut with their axis perpendicular to the surface of the sheet has loosened so that they fell out of the blocks.

Since certain changes in the above invention and different embodiments of the processes and the products produced may be made without departing from the scope thereof, it is intended that the matter contained in the above description or drawing shall be interpreted as illustrative and not in a limiting sense.

I claim as my invention:

1. In the method of sealing an opening in a member, the steps comprising preparing a body of a solid polymer selected from the group consisting of polytetrafluoroethylene and polychlorotrifluoroethylene by compressing the solid polymer at a pressure of above 100 p. s. i. at a temperature of above about 320° C. for polytetrafluoroethylene and above about 250° C. for polychlorotrifluoroethylene and maintaining the pressure upon the body until the temperature is substantially below 200° C. whereby the released body of polymer has the property of unmolding such that when heated to a temperature of 200° C.

and higher it will expand permanently in at least one dimension, such permanent expansion being substantially at room temperature, and one cross-sectional area will exhibit a substantial permanent increase of area when heated to a temperature of at least 200° C., preparing a plug from the body of the polymer, the plug having a transverse cross-section corresponding closely to the opening to be sealed, the transverse cross-section of the plug comprising the said one cross-sectional area exhibiting a substantial permanent increase in area when heated to at least 200° C., disposing the plug in the opening with the cross-sectional area being disposed in the general plane of the opening, and heating the applied plug to a temperature of at least 200° C. to cause the plug to expand permanently and fill the opening tightly.

2. In the method of sealing an opening in a member, the steps comprising cold working a body of a solid polymer of a density of at least 2 selected from the group consisting of polytetrafluoroethylene and polychlorotrifluoroethylene until the density is at least 2.09, whereby the cold worked body of polymer has the property of unmolding such that when heated to a temperature of 200° C. and higher it will expand permanently in at least one dimension, such permanent expansion being substantial at room temperature, and one cross-sectional area will exhibit a substantial permanent increase of area when heated to a temperature of at least 200° C., preparing a plug from the body of the polymer, the plug having a transverse cross-section corresponding closely to the opening to be sealed, the transverse cross-section of the plug comprising the said one cross-sectional area exhibiting a substantial permanent increase in area when heated to at least 200° C., disposing the plug in the opening with the cross-sectional area being disposed in the general plane of the opening, and heating the applied plug to a temperature of at least 200° C. to cause the plug to expand permanently and fill the opening tightly.

3. In the method of sealing an opening in a member the steps comprising severing a predetermined portion of a body of a polymer of a density of at least 2.09 selected from the group consisting of polytetrafluoroethylene and polychlorotrifluoroethylene, heating the severed portion to a temperature of at least 200° C. for a period of time of the order of one hour, cooling the portion to room temperature and determining the dimension and cross-sectional area of the portion exhibiting the maximum permanent increase due to the unmolding caused by the heating, then severing from the body of the polymer a plug having a cross-section substantially identical with that of the opening to be sealed, the plug being so severed from the body with respect to the said previously severed portion that the cross-sectional area of the plug is substantially parallel to the cross-sectional area of the portion, as it was originally located in the body, exhibiting the maximum permanent increase in area, disposing the plug in the opening with the cross-sectional area being disposed in the general plane of the opening, and heating the applied plug to a temperature of at least 200° C. to cause the plug to expand permanently and fill the opening tightly.

4. The method of providing a substantially hermetical seal at the ends of a sheathed heating element, said heating element comprising a tubular sheath, a heating element disposed in the sheath, insulation disposed between the heating element and the sheath and leads from the heating element extending beyond the ends of the sheath, comprising severing a predetermined portion of a body of a polymer of a density of at least 2.09 selected from the group consisting of polytetrafluoroethylene and polychlorotrifluoroethylene, heating the severed portion to a temperature of at least 200° C. for a period of time of the order of one hour, cooling the portion to room temperature and determining the dimension and cross-sectional area of the portion exhibiting the maximum permanent increase due to the unmolding caused by the heating, then severing from the body of the polymer a plug having a cross-section substantially identical with the cross-section of the sheath, each plug having an aperture substantially the size of the lead to enable passing the lead therethrough, the plug being so severed from the body of the polymer with respect to the said previously severed portion that the cross-section of the plug is substantially parallel to the cross-sectional area of the portion, as it was originally located in the body, exhibiting the maximum increase in area, placing each plug within an end of the sheath with the lead passing through the aperture in the plug, the said cross-section of the plug being disposed parallel to the cross-section of the sheath, and heating the sheath and applied plugs to a temperature of at least 200° C. to cause the plugs to expand permanently and tightly fill the ends of the sheath to provide for sealing it.

5. A sealed sheathed heating element comprising a tubular sheath, a heating element disposed in the sheath, insulation disposed between the heating element and the sheath and leads from the heating element extending beyond the ends of the sheath, sealing plugs of a polymer selected from the group consisting of polytetrafluoroethylene and polychlorotrifluoroethylene tightly fitted into each end of the sheath, each plug having an aperture through which a lead passes, the plugs being prepared and applied in accordance with the process of claim 4.

JACK SWISS.

No references cited.